US 6,707,012 B2

(12) United States Patent
Stone, Jr.

(10) Patent No.: US 6,707,012 B2
(45) Date of Patent: Mar. 16, 2004

(54) POWER SUPPLY FOR ELECTRICALLY HEATED SUBSEA PIPELINE

(75) Inventor: Francis M. Stone, Jr., League City, TX (US)

(73) Assignee: Shell Oil Company, Houston, TX (US)

( * ) Notice: Subject to any disclaimer, the term of this patent is extended or adjusted under 35 U.S.C. 154(b) by 41 days.

(21) Appl. No.: 09/910,625

(22) Filed: Jul. 20, 2001

(65) Prior Publication Data

US 2003/0015519 A1 Jan. 23, 2003

(51) Int. Cl.[7] .......................... H05B 3/02; F16K 49/00; E03B 7/12
(52) U.S. Cl. ........................ 219/482; 392/469; 405/169; 324/721
(58) Field of Search ................................ 219/494, 506, 219/482, 483, 490; 392/469, 301, 311, 304; 324/425, 721; 405/158, 169, 154.1; 137/341; 138/33

(56) References Cited

U.S. PATENT DOCUMENTS

| 972,308 | A | 10/1910 | Williamson | |
| 1,231,202 | A | 6/1917 | Saylor | |
| 2,096,279 | A | 10/1937 | Karcher | ........................ 255/28 |
| 2,178,720 | A | 11/1939 | Daniels | ........................ 219/47 |

(List continued on next page.)

FOREIGN PATENT DOCUMENTS

| EP | 1070907 | 1/2001 | ............ F16L/59/14 |
| GB | 2084284 | 7/1982 | ............ F16L/53/00 |
| SU | 569815 | 9/1977 | |
| WO | 103122 | 4/1937 | |
| WO | 1359445 | 3/1973 | ............ F16L/25/00 |
| WO | 1437587 | 7/1974 | ............ F16L/13/10 |
| WO | 1532730 | 10/1976 | ............ F16L/25/01 |

OTHER PUBLICATIONS

"Cable–Free Electrical Systems for the Oil to Gas Industry," Production Technologies Company, L.L.C., 600 Kenrick, Suite C–30; Houston, TX 77060, advertisement, Copyright 1996, 6 pp.
"Dunbar in Depth,"Offshore Engineer, Dec. 1994, 2 pp.
"Introduction to Direct Heating ofSubsea Pipelines," overview by Statoil, Saga Petroleum, CSO Norge, Alcatel, Kabel Norge and EFI, Feb. 1988.
"Monolithic Pipeline Electrical Isolation Joints," Hydro-Tech Systems, Inc., Engineered Pipeline Products, advertisement, Nov. 1996, 6 pp.
"New Double Pipe Insulated System (DPIS) Designed by Snamprogetti", Snamprogetti Offshore Division, Viale de Gasperi 16, San Donato Milanese, Milan, Italy, advertisement, 6 pp.
"Skin Effect Pipe Heating Systems," Thermo Systems Technology Inc. (TST), Four Commerce Park Square, 23200 Chagrin Boulevard, Suite 600, Beachwood, Ohio 44122, Copyright 1991, advertisement, 4 pp.
Stop Paraffin Build–up and Realize Your Well's Full Potential . . . Plug in Paratrol. International, Inc. (PTI), 15423 Vantage Parkway East, Houston, Texas 77032, advertisement, Copyright 1989, 6 pp.
"Tubing Casing Wireless Telemetry (Tucas System)," Schlumberger web page (1993?/Jun. 1996), 16 pp.
A. Anselmi et al., "TTDPIS: A New Underwater Technology in the Field of Traced Insulated Pipelines," 1994 OMAE, vol. 5, Pipeline Technology, ASME, 1994, pp. 69–76.

*Primary Examiner*—Tu Ba Hoang

(57) ABSTRACT

A power supply system for electrically heated pipelines is provided. A variable frequency drive supplies power to the pipeline from an external source of electrical power. An isolation transformer and a contactor or isolating switch may be used between the variable frequency drive and the pipeline. A controller may be used in the system to control special sequences of power level and other needs for heating a pipeline.

10 Claims, 1 Drawing Sheet

U.S. PATENT DOCUMENTS

| | | | |
|---|---|---|---|
| 2,206,831 A | 7/1940 | Berthelsen | 74/440 |
| 2,217,857 A | 10/1940 | Byck | 166/21 |
| 2,224,403 A | 12/1940 | Lines | 219/39 |
| 2,306,831 A | 12/1942 | Proctor | 219/39 |
| 2,660,249 A | 11/1953 | Jakosky | 166/17 |
| 2,678,377 A | 5/1954 | Justiz | 219/40 |
| 2,714,930 A | 8/1955 | Carpenter | 166/60 |
| 2,757,738 A | 8/1956 | Ritchey | 166/39 |
| 2,982,354 A | 4/1957 | Green | 166/60 |
| 2,851,197 A | 9/1958 | Colton | 222/146 |
| 3,184,958 A | 5/1965 | Eaton | 73/40.5 |
| 3,388,724 A | 6/1968 | Mowell et al. | 138/149 |
| 3,423,570 A | 1/1969 | Trabilcy | 219/301 |
| 3,432,186 A | 3/1969 | Braun | 285/53 |
| 3,439,075 A | 4/1969 | Bauer et al. | 264/45 |
| 3,507,330 A | 4/1970 | Gill | 166/248 |
| 3,515,837 A | 6/1970 | Ando | 219/10.49 |
| 3,547,193 A | 12/1970 | Gill | 166/248 |
| 3,556,218 A | 1/1971 | Talley, Jr. et al. | 166/265 |
| 3,605,888 A | 9/1971 | Crowson et al. | 166/248 |
| 3,614,986 A | 10/1971 | Gill | 166/303 |
| 3,620,300 A | 11/1971 | Crowson | 166/248 |
| 3,630,038 A | 12/1971 | Ando | 61/72.1 |
| 3,642,066 A | 2/1972 | Gill | 166/248 |
| 3,706,872 A * | 12/1972 | Tabilcy | 392/469 |
| 3,789,188 A | 1/1974 | Rudbarg | 219/301 |
| 3,859,503 A | 1/1975 | Palone | 219/278 |
| 3,885,595 A | 5/1975 | Gibson et al. | 138/155 |
| 3,933,031 A | 1/1976 | Uhlarik | 73/40.5 R |
| 3,935,632 A | 2/1976 | Maxson | 29/455 R |
| 3,944,262 A | 3/1976 | Stiner et al. | 285/53 |
| 3,958,636 A | 5/1976 | Perkins | 166/248 |
| 3,975,617 A | 8/1976 | Othmer | 219/300 |
| 3,981,181 A | 9/1976 | Ochiai | 73/40.5 R |
| 6,049,657 A * | 4/2000 | Sumner | 392/469 |
| 6,264,401 B1 * | 7/2001 | Langner et al. | 405/169 |
| 2003/0020499 A1 * | 1/2003 | Bass | 324/721 |

\* cited by examiner

POWER SUPPLY FOR ELECTRICALLY HEATED SUBSEA PIPELINE

BACKGROUND OF THE INVENTION

1. Field of the Invention

The present invention relates to electrical heating of subsea pipelines. More particularly the invention relates to a power supply system for supplying electrical power to the pipeline.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by a variety of heating methods, including electrical heating. Heating by a variety of electrical methods is well known in industry. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999). One electrical heating method is the pipe-in-pipe method. In one configuration of this method, a pipe-in-pipe subsea pipeline is provided by which a flow line for transporting well fluids is the inner pipe and it is surrounded concentrically by and electrically insulated from an electrically conductive outer pipe until the two pipes are electrically connected at bulkhead at the distal or remote end of a heated segment. Voltage is applied between the inner and outer pipes at the proximate or electrical input end and electrical current flows along the exterior surface of the inner pipe and along the interior surface of the outer pipe. This pipe-in-pipe method of heating is disclosed, for example, in U.S. Pat. No. 6,142,707, which is commonly assigned and hereby incorporated by reference herein. Anther configuration for electrical heating of subsea pipelines is the "single heated insulated pipe" method, in which only one pipe is insulated from seawater by an electrically insulating coating. This configuration is disclosed in commonly owned patent application Ser. No. 09/629,963, entitled "Apparatus and Method for Heating Single Insulated Flowlines." Other heating configurations include the earthed-current system developed in Norway and described in "Introduction to Direct Heating of Subsea Pipelines," overview by Statoil, Saga et al, February 1998.

In any form of electrical heating of pipelines a source of electrical power supplying at least a few hundred kilowatts is normally needed. The power often needs to be applied in a programmed sequence to achieve selected operating conditions. In some methods of electrical heating, such as the pipe-in-pipe method, it is desirable that the output of the power supply have very low harmonic content and be delivered with little or no direct current. Selection of a particular frequency may be an advantage. Conversion of power from three-phase to single-phase will often be necessary, especially in subsea pipeline applications, where power may be taken from an existing three-phase power grid on an offshore platform. What is needed is an efficient, versatile power supply system that can supply these needs.

SUMMARY OF THE INVENTION

A system including a variable frequency drive that may be electrically connected to a power bus and a Distributed Control System (DCS) is provided. A medium voltage drive will normally be employed. The output of the variable frequency drive is preferably coupled to a pipeline through an isolation transformed and a contactor or isolating switch. Control of the variable frequency drive may be provided by a DCS that is connected with the variable frequency drive through an Ethernet connection or is directly connected.

DETAILED DESCRIPTION

U.S. Pat. No. 6,142,707 and patent application filed concurrently herewith and titled "Annulus for Electrically Heated Pipe-in-Pipe Subsea Pipeline" (Ser. No. 09/910,696) both commonly owned, are incorporated herein by reference.

Figure 1:
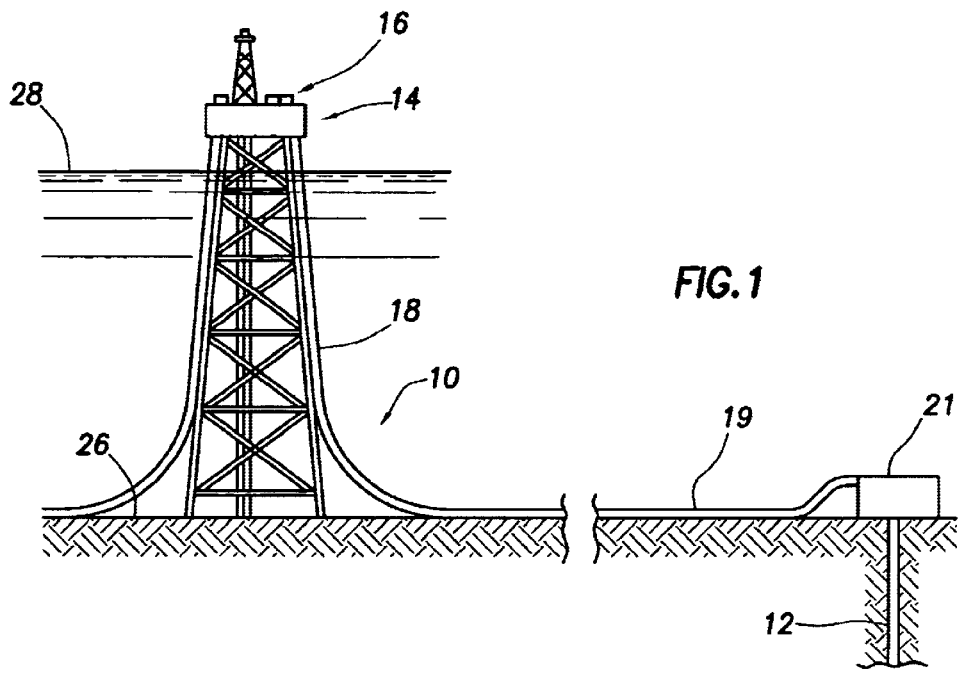
FIG. 1 shows one environment of use of a power supply to heat a subsea pipeline.

FIG. 1 illustrates the environment of the present invention. Here remote satellite well 12 is connected to platform 14 with subsea pipe-in-pipe pipeline 10. Subsea pipeline 10 may consist of seafloor section 19 and riser section 18. Seafloor section 19 may be up to 20 or more miles long. Pipe-in-pipe flowline 10 may be comprised of 40-ft joints of pipe welded together. It is common to form individual 150 ft segments of pipe, called quads (four joints), which are then welded together as they are placed subsea to form pipe-in-pipe flowline 10. Seafloor section 19, which may be a half-mile or more below surface 28 of the ocean, terminates at sled 21.

Surface facility 16 on platform 14 includes a power supply and associated control equipment for applying and controlling electrical power to the pipeline. Power may be applied at one end of the pipeline or at any intermediate point along the pipeline.

The power requirements for heating a pipeline may be moderate in comparison with the power available on offshore platforms, and excess power may already be available on a platform. If the equipment available on a platform is not capable of supplying the power needed, the platform must have provisions for adding electrical power.

Figure 2:
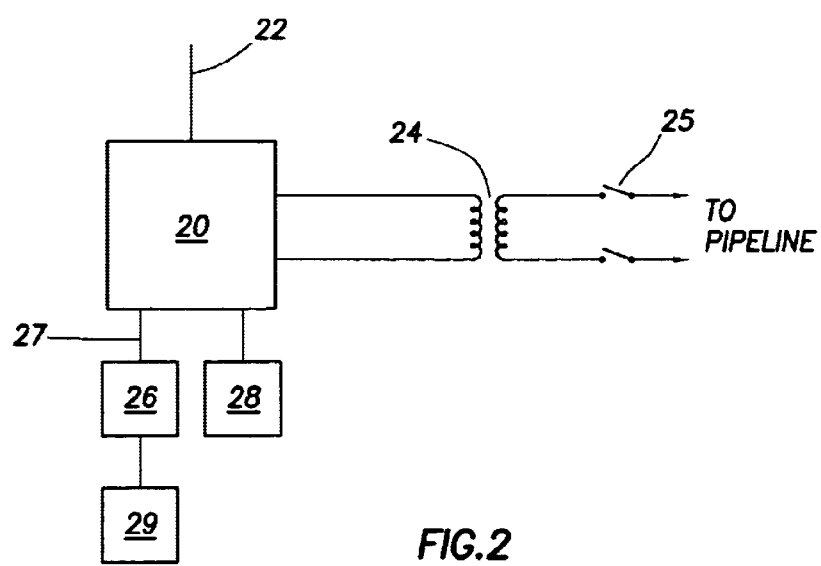
FIG. 2 shows details of connection of the power supply system of this invention to a subsea pipeline.

FIG. 2 illustrates a power supply and associated control equipment suitable for heating a pipeline. Drive 20 is preferably a variable frequency drive. A drive in the "Perfect Harmony Series" of drives supplied by Robicon Corporation of New Kingsington, Pa. may be used. This drive has an 18-pulse input AC to DC converter. It produces sine wave output with total harmonic distortion in current of 0.8% and in voltage of 1.2%. Total variable frequency drive (VFD) system efficiency higher than 96%. The drive is powered though three phase bus 22 and provides a single phase output. The output may be directly connected to a pipeline for heating The output of drive 20 may also be fed to the primary of isolation transformer 24, such that the small direct current in the drive output (which can cause corrosion) is eliminated before the approximately 60 Hz voltage is applied to a pipeline. Transformer 24 may be integral with drive 20. Contactor or isolating switch 25 may also be placed between the drive and a pipeline. This can make possible electrical diagnostic testing of the pipeline without interference from drive 20 or transformer 24. Also, open circuit tests can then be performed on drive 20.

Important features of the variable frequency drive are: it presents a balanced load through the three phase bus or generator from the single phase pipeline load, it allows continuous and rapid variation of applied voltage from zero to the rated voltage, it eliminates the need for a costly and space consuming phase balancing matching network, it has very low harmonic content and it is controllable locally or remotely from a Distributed Control System (DCS). Low harmonic content is important because impedance of the line is variable with frequency. DCS 26 may be connected with drive 20 through Ethernet connection 27 or any other communication channel. DCS 26 may be programmed to shut down the drive when high or low conditions exist and for other purposes. DCS 26 includes the capability of controlling the temperature of the pipeline with a closed loop Proportional Integral Differential (PID) temperature controller and includes the capability for high- and low-temperature alarms, high- and low-impedance alarms, graphic displays of power, voltage, current, and impedance, maintaining a history of operating parameters, programming various combinations of voltage or current versus time, and displaying learned temperature response to applied voltage and current versus time. A suitable DCS is supplied by Foxboro Company.

Drive 20 may be operated at constant voltage output, constant power output, or variable power in response to temperature or other sensors used to detect conditions in a pipeline. A temperature sensor on pipeline 10 (FIG. 1) may be used to control power output of drive 20 to maintain temperature within a range of a selected set point, for example. As another example, calculated power input from drive 20 and time of operation may be programmed to melt a hydrate plug in a pipeline. A separate drive is normally used for each pipeline segment to be heated.

In one application, a drive having a rated capacity of 3250 volts and 400 amperes was selected. For purposes of stable internal phase balancing, the drive frequency was selected to be 63 Hz.

Data recorder 29 can be attached to DCS 26 to keep a history of control signals sent to drive 20, or may be supplied integral with DCS 26. Alternatively, local controls 28 may be used to control drive 20. As an example of control signals that may be sent to drive 20, during start-up of electrical heating a pipeline, it may be desirable to step up voltage in increments, such as 400 volt increments, to help avoid unrecoverable faults in the annulus caused by water-induced arcing. Such control signals can be programmed into DCS 26 and the signals can be applied to drive 20. As another example of the use of control signals sent to drive 20, during commissioning activities of a pipeline, it may be desirable to operate the power system over the entire range of current and voltage expected. The system can then be operated briefly at increments of voltage or current over the entire range up to operating voltage and current and power factor can be recorded at each voltage setting. Current may be increased in 50 ampere increments, for example. These values can then be compared with values predicted based on prior measurements of impedance of segments of the pipeline before they are joined together. Other programmed sequences of voltage or current output may be used.

While particular embodiments of the present invention have been described, it is not intended that these details should be regarded as limitations on the present invention, except to the extent that they are included in the appended claims. It should be understood that various changes, substitutions and alterations can be made hereto without departing from the spirit and the scope of the invention as defined by the appended claims.

What is claimed is:

1. An electrical power supply system for heating a subsea pipeline, comprising:
   a subsea pipeline for carrying produced hydrocarbons to a production system;
   a variable frequency drive electrical power system located on a supply platform at the ocean surface to supply voltage and current;
   at least one insulated conductor in electrical communication between said variable frequency drive and said subsea pipeline.

2. The power supply system of claim 1 further comprising an isolation transformer in parallel between said variable frequency drive and said subsea pipeline.

3. The power supply system of claim 1 further comprising a control for the variable frequency drive.

4. The power supply system of claim 1 where the variable frequency drive comprises at least an 18-pulse input AC to DC converter.

5. The power supply system of claim 1 wherein the variable frequency drive produces a sine wave having a total harmonic distortion in the range from about 0.1% to about 1.0%.

6. The power supply system of claim 1 wherein the variable frequency drive has variable power to variable load efficiency greater than about 95%.

7. The power supply system of claim 3 wherein the control for the variable frequency drive comprises a distributed control system and a communication link with the variable frequency drive.

8. The power supply system of claim 7, wherein the distributed control system includes one or more of the features of a proportional integral differential temperature control loop an alarm, graphic display, a record of historical operating information, a graphic display of operational voltage versus time and a display of learned pipeline temperature response to applied voltage and current.

9. The power supply system of claim 7, wherein the communication link is a communications channel.

10. The power supply system of claim 3 wherein the control for the variable frequency drive is a local control.

* * * * *